United States Patent
Call et al.

(10) Patent No.: US 8,991,568 B2
(45) Date of Patent: Mar. 31, 2015

(54) BOLSTER MOUNTED BRAKE SYSTEM

(75) Inventors: Derick Call, Evans Mill, NY (US); Howard E. Huber, Jr., Black River, NY (US); Steven R. Newton, Adams, NY (US); Jeffrey F. Sauter, Lowville, NY (US); Eric Wright, Evans Mill, NY (US)

(73) Assignee: New York Air Brake Corporation, Watertown, NY (US)

( * ) Notice: Subject to any disclaimer, the term of this patent is extended or adjusted under 35 U.S.C. 154(b) by 518 days.

(21) Appl. No.: 12/811,718

(22) PCT Filed: Mar. 8, 2010

(86) PCT No.: PCT/US2010/026476
§ 371 (c)(1),
(2), (4) Date: Jul. 6, 2010

(87) PCT Pub. No.: WO2010/141138
PCT Pub. Date: Dec. 9, 2010

(65) Prior Publication Data
US 2011/0108376 A1    May 12, 2011

Related U.S. Application Data

(60) Provisional application No. 61/184,476, filed on Jun. 5, 2009.

(51) Int. Cl.
| | | |
|---|---|---|
| *F16D 65/14* | (2006.01) | |
| *B61H 15/00* | (2006.01) | |
| *F16D 65/28* | (2006.01) | |
| *F16D 65/52* | (2006.01) | |
| *F16D 125/64* | (2012.01) | |

(52) U.S. Cl.
CPC ............ *B61H 15/0007* (2013.01); *F16D 65/28* (2013.01); *F16D 65/52* (2013.01); *F16D 2125/64* (2013.01)
USPC .............................. 188/214; 188/52; 188/202

(58) Field of Classification Search
USPC .......... 188/196 R, 197, 198, 202, 196 V, 207, 188/212, 214, 52, 53, 54, 55, 1.11 W
See application file for complete search history.

(56) References Cited

U.S. PATENT DOCUMENTS

| | | | |
|---|---|---|---|
| 3,177,984 A * | 4/1965 | Taylor | 188/197 |
| 3,297,116 A * | 1/1967 | Sander et al. | 188/196 D |
| 3,378,108 A | 4/1968 | McClure et al. | |
| 3,386,533 A | 6/1968 | Taylor et al. | |
| 4,312,428 A | 1/1982 | Beacon | |
| 4,766,980 A * | 8/1988 | Engle | 188/52 |
| 5,069,312 A | 12/1991 | Kanjo et al. | |
| 5,361,876 A | 11/1994 | Haverick et al. | |
| 6,135,242 A * | 10/2000 | Hockley | 188/1.11 R |
| 7,472,775 B2 | 1/2009 | Tuten | |
| 2003/0024774 A1 | 2/2003 | Huber, Jr. et al. | |

* cited by examiner

*Primary Examiner* — Nicholas J Lane
(74) *Attorney, Agent, or Firm* — David L. Nocilly; Bond Schoeneck & King, PLLC

(57) ABSTRACT

A brake system includes a brake cylinder having a piston rod and a brake lever connecting the piston rod to a brake beam and a slack adjuster. An actuating lever is connected to the brake beam and the brake cylinder. A trigger of the slack adjuster is connected to the actuating lever. The actuating lever is pivotally and rotationally connected to the brake beam and swivelably connected to the brake cylinder. Also, a piston stoke indictor including an indicia positioned on a support structure of a brake cylinder to be adjacent the end of a portion of a brake piston at its extended position.

8 Claims, 4 Drawing Sheets

BOLSTER MOUNTED BRAKE SYSTEM

CROSS-REFERENCE TO RELATED APPLICATIONS

The present application is the National Stage of International Application No. PCT/US2010/026476, filed Mar. 8, 2010, which claims the benefit of U.S. Provisional App. No. 61/184,476, filed Jun. 5, 2009.

BACKGROUND OF THE DISCLOSURE

The present disclosure relates generally to bolster mounted brakes and, more specifically, to a slack adjuster trigger for bolster mounted brakes and piston stroke indicator.

Brake systems for a rail car, for example, freight cars, include one or more brake beams to which the brake shoes are mounted and which is moved by an air operated brake cylinder. The brake cylinder is connected to the brake beams via various rods and levers. A slack adjuster is provided in the rods and levers systems to adjust for wear of the brake shoes. The slack adjuster has an actuator which is operated when necessary to allow slack adjustment.

Some braking systems mount the brake cylinder to the bolster or truck of a car. A typical example is shown in U.S. Patent No. 5,361,876 and a portion of which is illustrated in FIG. 1. For the most part, the reference numbers in FIG. 1 correspond to the numbers in the aforementioned patent and reference is made thereto for further details of the complete system.

FIG. 1 illustrates a portion of a bolster mounted brake system of the prior which is shown and described in detail in U.S. Pat. No. 5,361,876. The reference numbers in that patent are used for ease of reference and a complete understanding of the operation of the brake system. Any new reference number will be in the 100's.

A brake system includes a bolster 1 connected by side frames to an axel 6 which includes a wheel 9. A brake beam 12, carrying brake shoes (not shown), moves relative to the wheels to apply the brakes. A brake cylinder 64 is mounted by plate 63 to a support structure 62 which is connected to mounting plate 61. Plate 61 is mounted to the bolster 1. A pin 68 connects the piston rod yoke 67 to the brake lever 18. The other end of brake lever 18 is mounted to brake strut 28 of the brake beam 12 by pin 29. A support rod 106 for supporting the brake lever 18 is welded to the brake cylinder 64 and the mounting plate 61.

A slack adjuster 19, which is connected to the other brake beam (not shown), is connected to the brake lever 18 by a pin 32 through yoke 31 of the slack adjuster 19. The slack adjuster 19 includes a trigger bolt 100 adjustably positioned with respect to the slack adjuster trigger 102 by nuts 104. The other end of the trigger bolt 100 is connected to the actuating lever 53 by a bolt 54 through clevis 52.

The pin 29, which mounts on the brake lever 18 to the strut 28, also mounts one end of the actuating lever 53 of the trigger to the strut 28. Actuating lever 53 pivots about to the pin 29 as the brake beam 12 is moved relative to the brake cylinder 64. The other end of the actuating lever 53 is limited by guide 55 which acts as a stop. This end also is connected to the plate 63 of the cylinder 64 by a chain 57.

The operation of the brake system and the slack adjuster are well known and described in U.S. Pat. No. 5,361,876. Thus, detailed explanation will not be provided herein.

SUMMARY OF THE INVENTION

The present brake system includes a brake cylinder having a piston rod and a brake lever connecting the piston rod to a brake beam and a slack adjuster. An actuating lever is connected to the brake beam and the brake cylinder. A trigger of the slack adjuster is connected to the actuating lever. The actuating lever is pivotally and rotationally connected to the brake beam and swivelably connected to the brake cylinder.

A spherical bearing swivelably connects the actuating lever and the brake cylinder. The pivotal connection of the actuating lever and the brake beam includes two orthogonal axes. A support rod for supporting the brake level is removably mounted to the brake cylinder and a brake cylinder mounting structure.

A piston stroke indictor includes an indicia positioned on the support structure of the brake cylinder to be adjacent the end of a portion of the piston at its extended position to indicate the piston stroke range. The width of the indicia represents the piston stroke range.

These and other aspects of the present disclosure will become apparent from the following detailed description of the disclosure, when considered in conjunction with accompanying drawings.

DETAILED DESCRIPTION OF THE PREFERRED EMBODIMENTS

The bolster mounted brake system of the present disclosure is designed to reduce the number of parts, cost and installation time and increase longevity by reducing the wear and tear of the parts.

Figure 1:
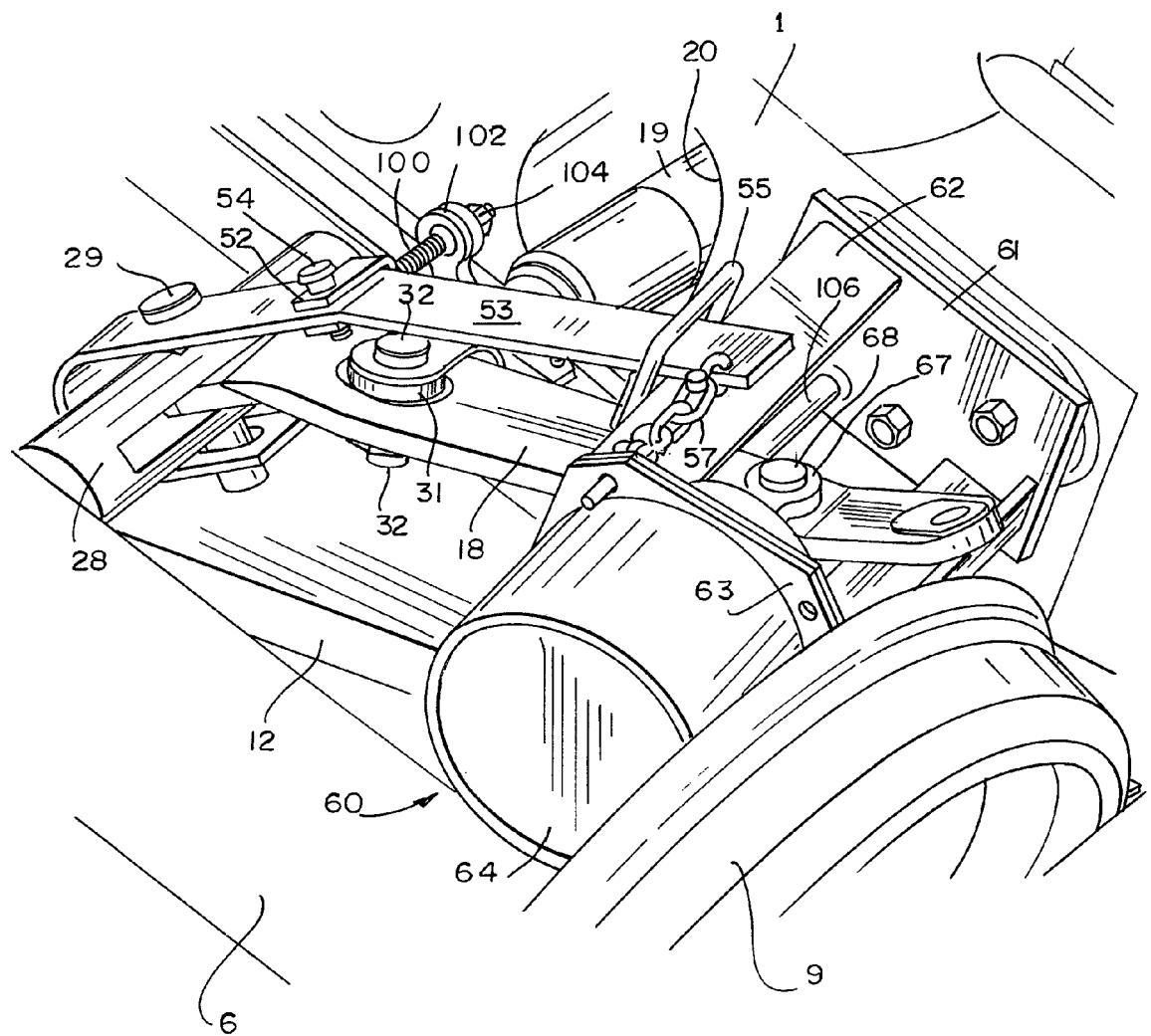
FIG. 1 is a perspective view of a portion of a bolster mounted brake system of the prior art.
Figure 2:
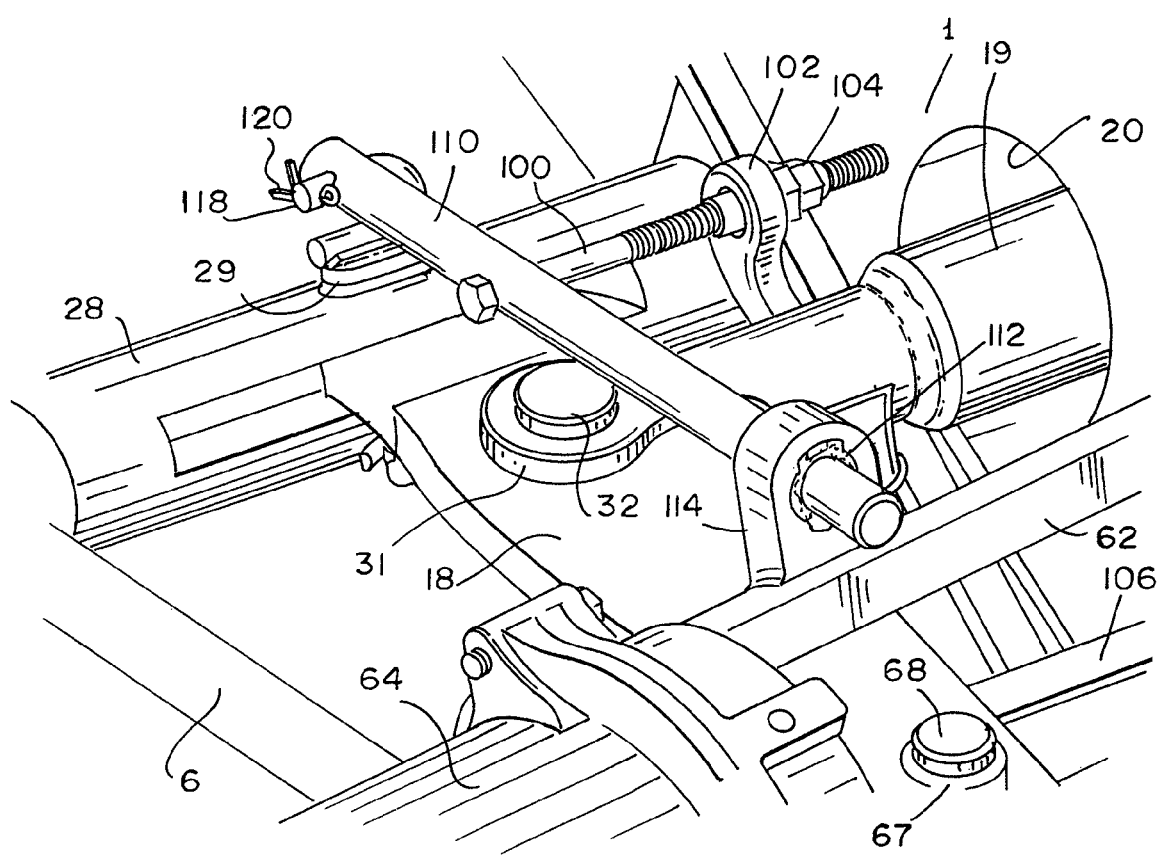
FIG. 2 is a perspective view of a portion of a first embodiment of a bolster mounted brake system of the present disclosure.
Figure 3:
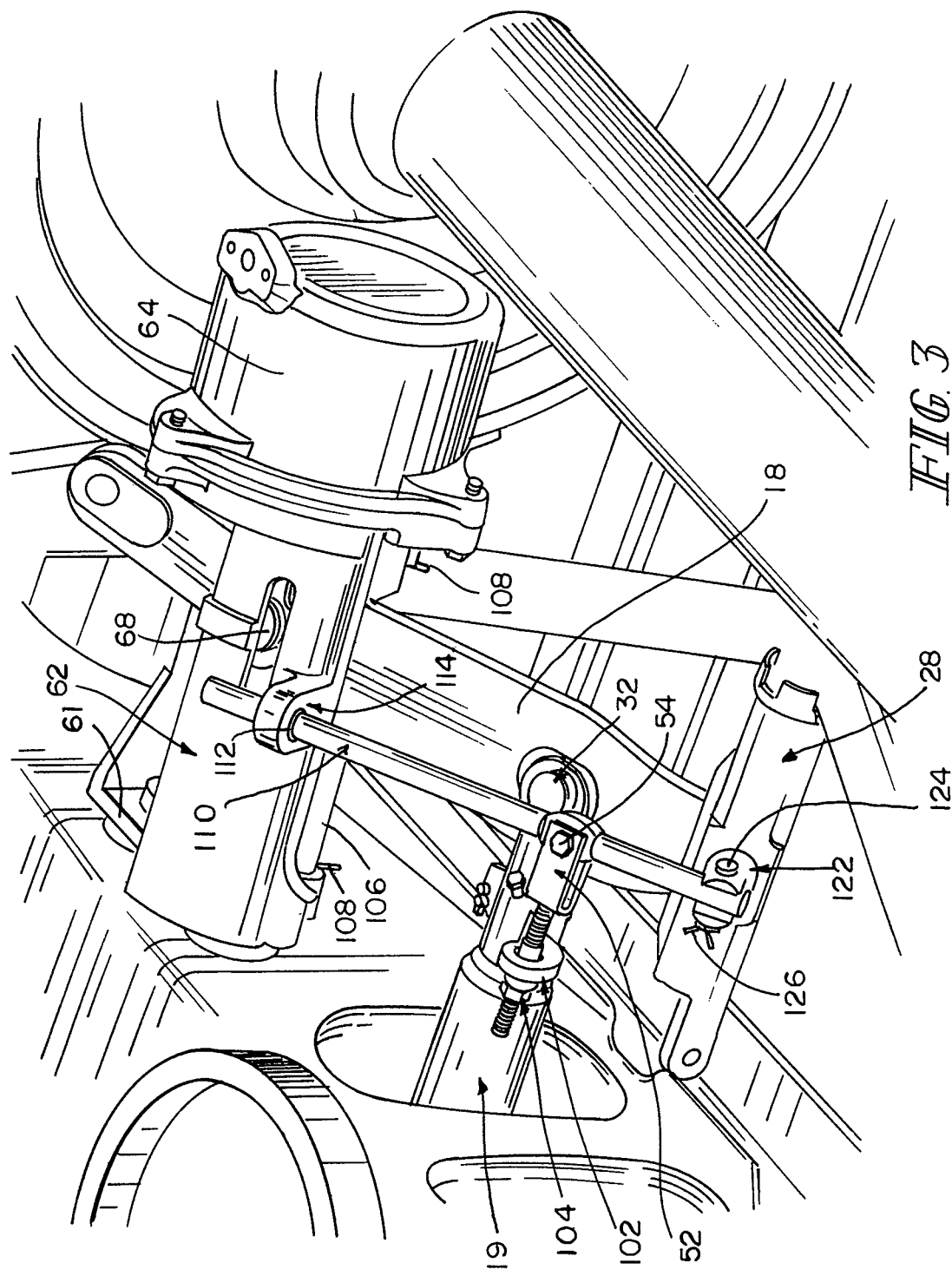
FIG. 3 is a perspective view of a portion of a second embodiment of a bolster mounted brake system of the present disclosure.

FIG. 2 describes a variation on the actuating lever 53 for the slack adjuster trigger 102 of FIG. 1. This structure reduces the number of parts, wear and tear and is easier to assemble and install. The J shaped actuating lever 53 of FIG. 1 is replaced by an actuating lever 110 shown as a rod. The trigger bolt 100 is received directly into an aperture in the actuating lever or rod 110. A clevis 52 and pin 54 are not needed. If desired, the clevis 52 may also be used, as shown in FIG. 3, and would not affect the operation to be described.

The first end of the actuator lever 110 is pivotally received on a U shaped bent rod 118 and held thereto by cotter pin 120. The U shaped rod 118 is welded onto the pin 29 which secures the brake lever 18 to the strut 28. A combination of the bent rod 118 and the pin 29 offers two axes of rotation for the rod 110. Rotation of pin 29 allows rotation about a vertical axis while the bent rod 118 offers an orthogonal horizontal axis of rotation for that end of the trigger actuator rod 110.

The other end of the trigger actuating lever 110 is received in a spherical bearing 112 in bracket 114 which is part of or welded on to the support structure 62 for the brake cylinder 64. This spherical bearing provides a swivel or omni-degree of pivotal movement with respect to the brake cylinder 64.

These particular connections of the trigger actuator 100 reduces the amount of strain and stress upon the system in that both ends have multiple directions of movement or adjustment during the application and release of the brakes.

FIG. 3 shows a variation on the actuating lever or rod 110. The trigger bolt 100 is connected to the actuating lever or rod 110 by clevis 52 and pin 54. Also, the U shaped rod 118 welded onto the bolt 29 is replaced by a clevis 122, pin 124 and cotter pin 126. The clevis is welded to or part of the pin 29.

The assembly of the mechanism for the slack adjuster trigger begins after the connection of the link 18 to the piston rod yoke 67 by pin 68, to the slack adjuster 19 by pin 32 and to the brake beam strut 28 by pin 29. In the prior art of FIG. 1, the pin 29 is part of the connection of the actuating lever 53. Next, the actuating lever or rod 110 is inserted into spherical bearing 112. The other end of actuating lever or rod 110 is connected to the rod 118 or clevis 122. The trigger bolt 100 is connected to the actuating lever or rod 110 and the trigger 102 and adjusted by nuts 104.

Also shown in detail in FIG. 3 is the support rod 106 for the brake lever 18. The support rod 106 extends from the back of and through a hole in the mounting plate 61 into a hole in the head of the brake cylinder 61. The support rod 106 is held in place and removably mounted to the brake cylinder 64 and the mounting plate 61 by cotter pins 108. This allows the support rod 106 to be easily replaced by first disconnecting the mounting plate 61 from the bolster 1 and then removal of the of the cotter pins 108 if the support rod 106 shows excessive wear.

Figure 4:
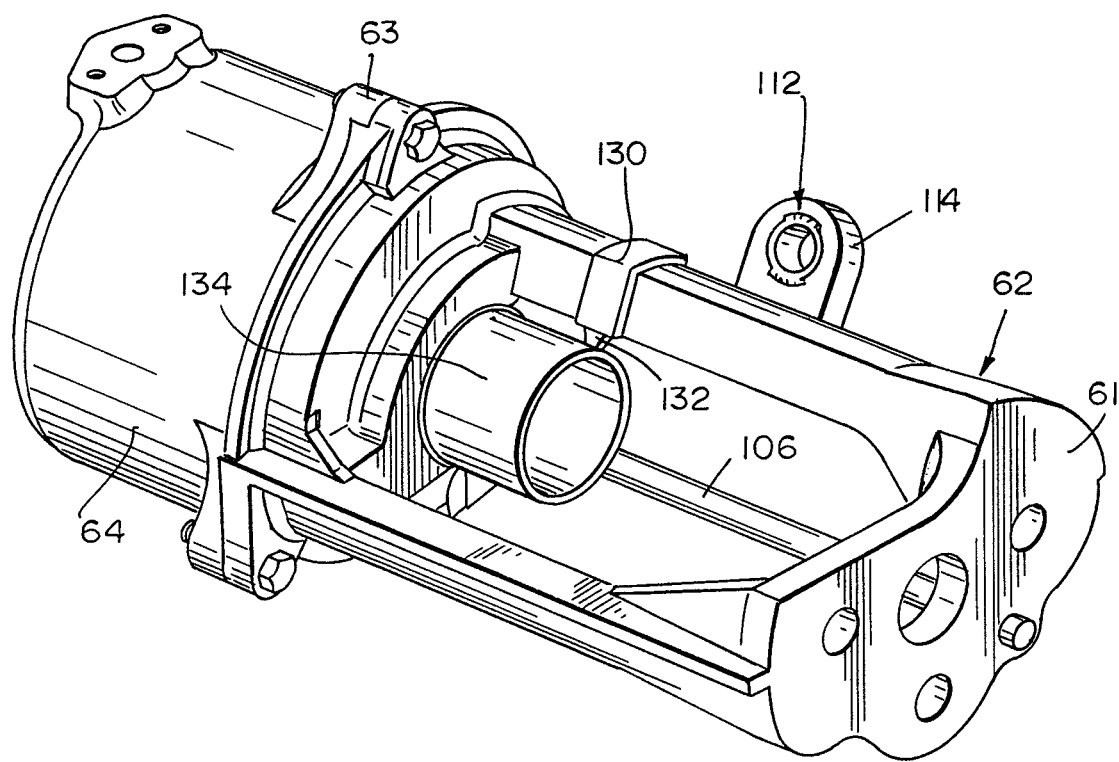
FIG. 4 is a perspective view of the brake cylinder of FIG. 3.

Details of the piston stroke indicator are shown in FIG. 4. A piston stroke indicator includes an indicia 130 is on the piston support structure 62. It may be part of the casting of the support structure 62 or separate and then secured thereto. The width of the indicia 130 indicates the acceptable range of the piston stroke. The nuts 104 of the slack adjuster trigger are adjusted until the end of a portion of the piston in the brake applied piston is adjacent the center 132 of the indicia 130. In FIG. 4, the piston guide 134 is aligned with the center 132 of the indicia 130. Other movable part of the piston, for example the piston rod not shown in FIG. 4, may be used for alignment. As an example, for a stroke of 2¾ inches, the range of width of the indicia would be 1 inch representing a variance of ½ inch.

Although the present disclosure had been described and illustrated in detail, it is to be clearly understood that this is done by way of illustration and example only and is not to be taken by way of limitation. The scope of the present disclosure is to be limited only by the terms of the appended claims.

What is claimed:

1. A brake system comprising:
   a brake cylinder having a piston rod;
   a brake lever connecting the piston rod to a brake beam and a slack adjuster;
   an actuating lever connected at one end to the brake beam by both a first pivot for movement about a first axis and a second pivot for movement about a second, different axis and at an opposite end by a swivel comprising a spherical bearing to the brake cylinder; and
   a trigger of the slack adjuster being connected to the actuating lever.

2. The brake system of claim 1, wherein the first axis is orthogonal to the second axis.

3. The brake system of claim 1, wherein the first pivot comprises a pin rotationally connected to the brake beam and the second pivot comprises a rod connected to the pin and to the actuating lever.

4. The brake system of claim 1, wherein the first pivot comprises a pin rotationally connected to the brake beam and the second pivot comprises a clevis connected to the pin and to the actuating lever.

5. The brake system of claim 1, wherein the brake cylinder includes a support rod for supporting the brake lever and the lever support rod is removably mounted to the brake cylinder and a brake cylinder mounting structure.

6. The brake system of claim 5, wherein the support rod extends through a hole in the brake cylinder mounting structure and into a hole in the brake cylinder and is retained by cotter pins.

7. The brake system of claim 1, further comprising:
   a support structure mounting the brake cylinder and the piston rod to a bolster;
   an indicia positioned on the support structure to be adjacent the end of the piston rod at the extended position.

8. The indicator of claim 7, wherein a width of the indicia represents a piston stroke range of the piston rod.

* * * * *